A. Z. Mason,
Vise.
Nº 92,331.     Patented July 6. 1869.
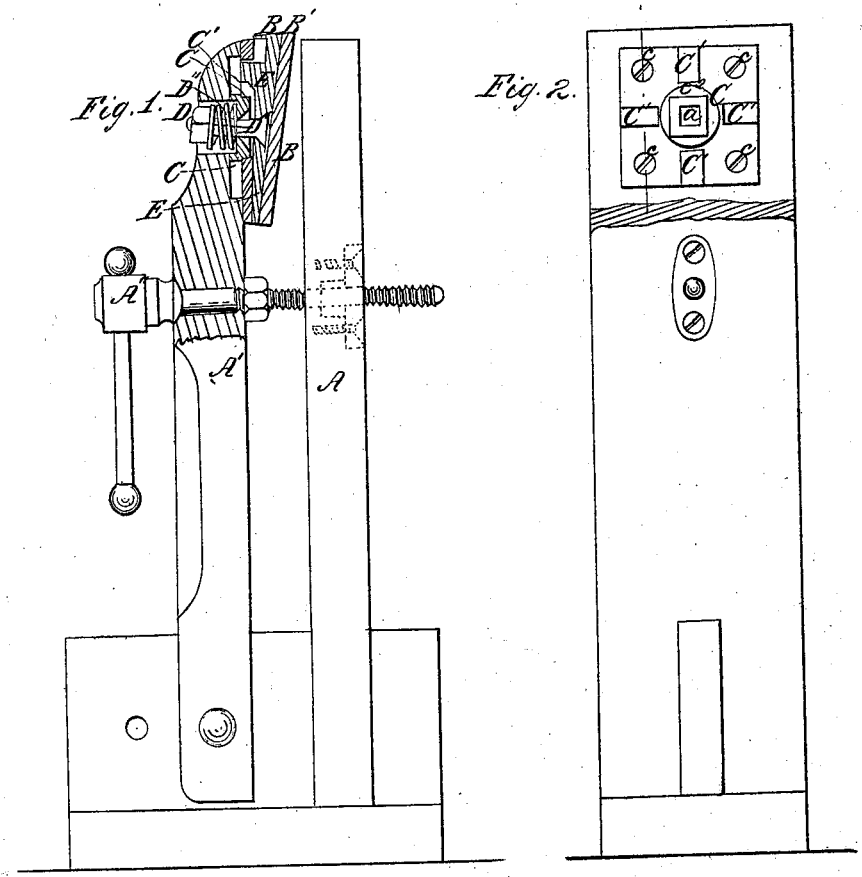
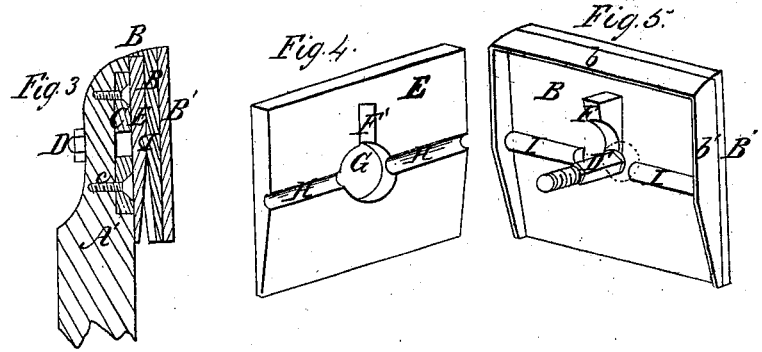
Witnesses:
Inventor;
A. Z. Mason
By Knight Bro

United States Patent Office.

A. Z. MASON, OF ADRIAN, MICHIGAN.

Letters Patent No. 92,331, dated July 6, 1869.

---

IMPROVEMENT IN VISE.

---

The Schedule referred to in these Letters Patent and making part of the same.

---

*To all whom it may concern:*

Be it known that I, A. Z. MASON, of Adrian, in the county of Lenawee, and State of Michigan, have invented certain new and useful Improvements in Vises, the same being improvements upon bevel-vises, for which Letters Patent were issued April 28 and September 8, 1868, to A. Z. Mason and R. B. Robbins, assignees to R. B. Robbins; and I do hereby declare the following to be a full, clear, and exact description of the same, reference being had to the accompanying drawing, forming part of this specification.

The object of my invention is to simplify the construction, and add to the strength and utility of the devices for holding wedge-shaped surfaces by attachment to vises, and for which Letters Patent were granted as aforesaid.

The improvement is especially designed for wooden vises, and wood-working generally, but it may be applied with equal facility and efficacy to iron vises and working of metals.

I subjoin the following description of its different parts and manner of use, to enable those skilled in the art to manufacture it.

The same letters of reference represent similar parts in the accompanying drawing.

In the drawing—

Figure 1 represents an upright side elevation, partly in section, showing my invention arranged for wedged surfaces.

Figure 2, a rear view, with the movable face-plate and the upper part of the rear jaw of the vise removed.

Figure 3, a vertical section on the line $x$–$x$, fig. 2, showing the manner of affixing the movable face-plate to the vise, when desired to be used for holding ordinary straight or plane surfaces.

Figures 4 and 5 are perspective views of the two parts of the movable face-plate detached.

A A' represent the fixed and movable jaws of a common wooden vise.

B B', E, and C, my movable face-plate, fastened in position by the screw $D^1$, and held stationary at any desired point by the nut D, countersunk into the wood of the jaw A'.

The movable face-plate itself consists of three pieces, represented by C, figs. 1, 2, and 3; E, figs. 1, 3, and 4; and B, figs. 1, 3, and 5.

The first piece, C, consists of a metal plate, countersunk in and fastened permanently to the jaw A' of the vise, by means of screw $c$, figs. 2 and 3.

This plate is provided with a central hole, G', to receive the screw $D^1$, by which the movable face-plate is fastened to the jaw A'.

This hole is made square, as is also that portion of the screw $D^1$ that fits into it, for the purpose of keeping the screw stationary.

The plate C is further provided with four or more slots, C', made to receive the projection F on the piece B, and thus hold the face-plate B F firmly in position, in a manner hereinafter to be more fully set forth.

The part E consists also of a piece of metal, of the shape represented in fig. 4, with a circular hole, G, in the centre, to receive the shoulder $c^2$ on the plate C, fig. 2.

One side of this piece is flat, the other wedge-shaped from the centre to the lower edge, as seen in fig. 4.

At the point where the wedge-shape begins, is a groove, H, extending across from side to side, calculated to receive the ridge I I on the part B.

F' is a slot, which permits the projection F on the part B to pass through and enter the slots $c^1$, in the plate C, for the purpose specified.

The piece B is also of metal, furnished upon the outer surface, which is flat, with a corresponding flat piece of wood, B', securely fastened to it by screws or other proper means.

The lower half of the inner surface of B is also wedge-shaped, to correspond with the shape of E.

This wood B' is used to prevent the objects worked being marred by contact with the metal plate.

The piece B is furnished with a rim or flange, $b$, upon three sides, and is large enough to receive the part E within said sides, two of which, $b'$ $b'$, are bevelled, to correspond with the wedging shape of the lower half of the piece E.

The two pieces being placed together, the wedge I fits snugly into the groove H, the projection F passes through the slot F'; the screw $D^1$ through the hole G.

This screw is fastened into the piece B by a head, covered by the wood B', and revolves readily in its place, and permits the rotation of the piece B upon its axis.

The spring $D^2$ serves to hold the projection F within whichever of the slots C' it may be adjusted to.

Having thus explained the construction and use of the different parts, in order to enable others more clearly to understand the object of my invention, I give the following illustration of its utility:

Having placed the pieces E B together, as is intended, we pass the screw $D^1$ through the opening G, figs. 1 and 2; place the spring $D^2$ into the countersink, as shown in fig. 1, and screw on the nut D.

We are now ready for operation. Suppose we wish to work upon pointed ends of a wedge; we turn the face-plate around until the projection F falls into the slot C' underneath the hole G; place the wedge in the vise in the desired position, and screw it in tight by means of the screw A''.

The peculiar construction of the two pieces E and B will cause them immediately to conform to the shape of the object in the vise, as represented in fig. 1.

By reversing the face-plate, causing the projection F to rest in either of the slots C' in the plate C, the wedge may be held in any desired position, as firmly as plane surfaces are held in ordinary vises.

If it is desired to hold a plane surface, arrange the face-plate so that the projection F will rest in the slot C' above the hole G, place in the object and screw up the vise. The pressure being upon the top or upper half of B, causes the two pieces E and B to assume the position represented in fig. 3.

By constructing the movable face-plate in the manner and form as described, more compactness is obtained, and a more durable piece of mechanism produced.

The ridge and groove or bearings H H and I I give a firmer support, and the wedging lower surfaces accomplish all that is necessary, in order to hold uneven surfaces of the kind described.

I do not claim the broad principle of holding wedge-surfaces by means of a movable face-plate; but

What I claim as new and of my own invention, and for which I wish to secure Letters Patent, is—

The combination of the parts E, B, and C, when the same are constructed and arranged to operate as described, and for the purpose set forth.

To the above specification of my invention, I have signed my hand, this 28th day of November, 1868.

A. Z. MASON.

Witnesses:
GEO. L. BACHMAN,
MILO SMITH.